A. A. DE LOOCH.
TRACK SCRAPER.
APPLICATION FILED MAY 17, 1909.
950,373.
Patented Feb. 22, 1910.
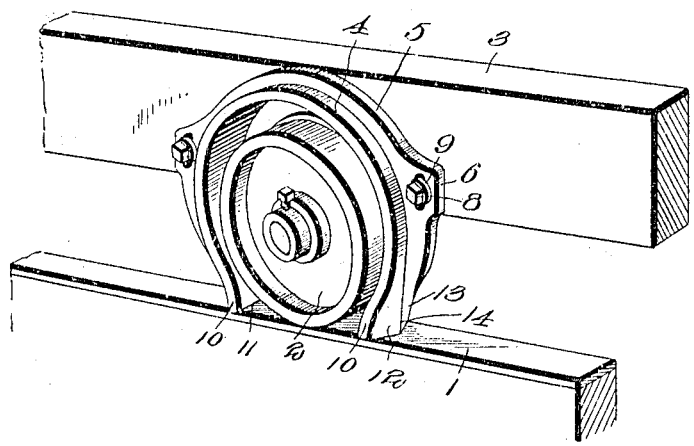
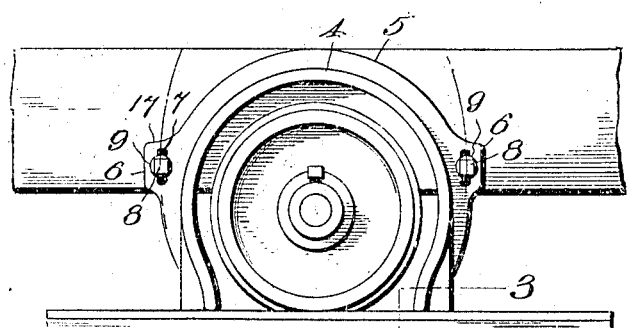
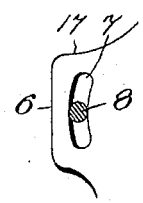
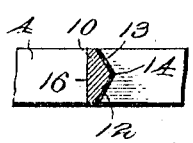
Witnesses
Geo. H. Byrne.
N. MacDuvall.
Inventor
A. A. DeLooch
by Wilkinson Fisher & Witherspoon
Attorney

UNITED STATES PATENT OFFICE.

ALONZO A. DE LOOCH, OF BRIDGEPORT, ALABAMA.

TRACK-SCRAPER.

950,373.	Specification of Letters Patent.	Patented Feb. 22, 1910.

Application filed May 17, 1909. Serial No. 496,627.

*To all whom it may concern:*

Be it known that I, ALONZO A. DE LOOCH, a citizen of the United States, residing at Bridgeport, in the county of Jackson and State of Alabama, have invented certain new and useful Improvements in Track-Scrapers; and I do hereby declare the following to be a full, clear, and exact description of the invention, such as will enable others skilled in the art to which it appertains to make and use the same.

My invention relates to track scrapers, especially to those scrapers used in connection with saw mill carriages, and has for its object to produce a simpler and more efficient scraper than those heretofore used, and at the same time, one that can be supplied at a lower cost.

To these ends the invention consists in the novel details of construction and combination of parts more fully hereinafter disclosed and particularly pointed out in the claims.

Referring to the accompanying drawings forming a part of this specification in which like numerals refer to like parts in all the views:—Figure 1, is a perspective view of my improved track scraper; Fig. 2, a side elevational view of the same; Fig. 3, a sectional detail view taken on the line 3—3 of Fig. 2; and Fig. 4, an enlarged detail view of one of the curved slots in the scraper body.

1 indicates any suitable track; 2 a wheel; and 3 a carriage or other part supported by said wheel. As is well known in saw mill carriages, the track often gets more or less covered with saw dust or other material, and the wheel in running over the same causes the carriage to rise and therefore to move the log or other stock being sawed relatively to the cutting tool. To prevent this undesirable movement, I provide a guard 4 of horseshoe form, which is preferably flanged as at 5 to give it rigidity, and which also has the ears or lugs 6. These ears are two in number, and each is preferably provided with a straight or slightly curved slot 7, preferably struck from the other slot as a center, as indicated in dotted lines Fig. 2. Through each of these slots loosely passes a bolt 8 provided with a washer 9, which bolt serves to securely hold the scraper to the carriage 3.

The lower ends 10 of the scraper are provided with a flat face 11, which contacts with the track, and an inclined face which may be either a single face 12, or there may be two inclined faces 12 and 13, oppositely inclined and meeting in the edge 14. The ends 10 are located at equal distances on each side of the track, and the flat faces 11 either rest directly on the track surface and scrape along the same, or else they are located slightly above it. In all cases the scraper is securely but loosely fixed by the bolts 6 to the carriage, and when saw dust or other material covers the track the inclined faces of the ends 10 throw the same to one or both sides of the track as the case may be, as will be readily understood. After the scraper is once fixed it often becomes necessary to delicately adjust the same to the track in order to get a more perfect operation of the parts; and when metal is to contact or nearly contact with metal, as in this case, it often involves a nice problem to get such an adjustment as will remain permanent in operation. If the slots are straight and the bolts 6 fit the same too closely, the adjustment of one end 10 will set up strains which will cause the parts to gradually work back to their former position, but if the slots are loose, or slightly curved, as disclosed, no such strains are encountered. Again, a relatively long bearing surface longitudinally of the track is desirable, in order that the tendency of the ends 10 being subjected to a pinching action and thereupon forced toward the wheel 2 may be avoided. This pinching action is largely avoided by the extending edges 14 which are located some distance from the inside surface 16, as best shown in Fig. 3. The top surface 17 of the ears 6 afford a convenient place to receive blows from a hammer when it is desired to adjust the two ends 10 to their proper positions. This action is also avoided by locating the said edges 14 substantially vertically under the bolts 6, so that the direction of any thrust strains will pass through said bolts, and thereby tend to lift the scraper.

The scraper being composed of an open frame, the wheel can be readily gotten at whenever desired, and it being of a simple and exceedingly strong design it can be cast or drop forged in a most inexpensive manner.

What I claim is:—

1. A track scraper composed of an open sided horse shoe shaped frame having the securing and strengthening flange 5 provided with the lugs 6; and the ends 10 each provided with an inclined surface, substantially as described.

2. A track scraper composed of an open sided horse shoe shaped frame, having the securing and strengthening flange 5 provided with the lugs 6 having the surfaces 17 adapted to receive blows for adjusting the parts and the slots 7; said scraper also provided with the ends 19 having the flat surfaces 11 and the oppositely inclined surfaces 12 and 13 meeting in the edge 14, the extreme end of which is located substantially under said slots, substantially as described.

In testimony whereof, I affix my signature, in presence of two witnesses.

ALONZO A. DE LOOCH.

Witnesses:
C. P. CAMPBELL,
FRED ROBINSON.

Affidavit having been filed showing that the name of the patentee in Letters Patent No. 950,373, granted February 22, 1910, for an improvement in "Track-Scrapers," should have been written and printed *Alonzo A. De Loach* instead of "Alonzo A. De Looch," it is hereby certified that the proper correction has been made in the files and records pertaining to the case in the Patent Office, and should be read in the said Letters Patent that the same may conform thereto.

Signed and sealed this 8th day of March, A. D., 1910.

[SEAL.]

C. C. BILLINGS,
*Acting Commissioner of Patents.*